US012148435B2

(12) United States Patent
Purnhagen et al.

(10) Patent No.: US 12,148,435 B2
(45) **Date of Patent: *Nov. 19, 2024**

(54) DECODING OF AUDIO SCENES

(71) Applicant: Dolby International AB, Dublin (IE)

(72) Inventors: Heiko Purnhagen, Sundbyberg (SE); Lars Villemoes, Järfälla (DK); Leif Jonas Samuelsson, Sundbyberg (SE); Toni Hirvonen, Jarfalla (FI)

(73) Assignee: Dolby International AB, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 18/317,598

(22) Filed: May 15, 2023

(65) Prior Publication Data

US 2023/0290363 A1 Sep. 14, 2023

Related U.S. Application Data

(60) Continuation of application No. 17/724,325, filed on Apr. 19, 2022, now Pat. No. 11,682,403, which is a continuation of application No. 16/938,527, filed on Jul. 24, 2020, now Pat. No. 11,315,577, which is a division of application No. 16/580,898, filed on Sep. 24, 2019, now Pat. No. 10,726,853, which is a (Continued)

(51) Int. Cl.

| | |
|---|---|
| ***G10L 19/008*** | (2013.01) |
| ***G10L 19/20*** | (2013.01) |
| ***H04S 3/02*** | (2006.01) |
| ***H04S 5/00*** | (2006.01) |

(52) U.S. Cl.

CPC ............ *G10L 19/008* (2013.01); *G10L 19/20* (2013.01); *H04S 3/02* (2013.01); *H04S 5/00* (2013.01); *H04S 2400/03* (2013.01); *H04S 2400/11* (2013.01); *H04S 2420/03* (2013.01); *H04S 2420/07* (2013.01)

(58) Field of Classification Search

CPC ......... G10L 19/008; G10L 19/20; H04S 3/02; H04S 5/00; H04S 2400/03; H04S 2400/11; H04S 2420/03; H04S 2420/07

See application file for complete search history.

(56) References Cited

U.S. PATENT DOCUMENTS 5,845,249 A 12/1998 Malladi
6,438,518 B1 8/2002 Manjunath
(Continued)

FOREIGN PATENT DOCUMENTS

CN 101529504 9/2009
CN 101809654 8/2010
(Continued)

OTHER PUBLICATIONS

Bin, H. et al "A Reconfigurable Design of AAC and AVS Audio Decoder Based on Software Hardware Cooperation" 2007, AAC AVS.

(Continued)

*Primary Examiner* — David L Ton

(57) ABSTRACT

Exemplary embodiments provide encoding and decoding methods, and associated encoders and decoders, for encoding and decoding of an audio scene which is represented by one or more audio signals. The encoder generates a bit stream which comprises downmix signals and side information which includes individual matrix elements of a reconstruction matrix which enables reconstruction of the one or more audio signals in the decoder.

7 Claims, 7 Drawing Sheets

Related U.S. Application Data continuation of application No. 16/367,570, filed on Mar. 28, 2019, now Pat. No. 10,468,039, which is a continuation of application No. 16/015,103, filed on Jun. 21, 2018, now Pat. No. 10,347,261, which is a continuation of application No. 14/893,852, filed as application No. PCT/EP2014/060727 on May 23, 2014, now Pat. No. 10,026,408.

(60) Provisional application No. 61/827,246, filed on May 24, 2013.

(56) References Cited

U.S. PATENT DOCUMENTS

| | | | |
|---|---|---|---|
| 7,394,903 | B2 | 7/2008 | Herre et al. |
| 7,567,675 | B2 | 7/2009 | Bharitkar |
| 7,680,288 | B2 | 3/2010 | Melchior |
| 7,756,713 | B2 | 7/2010 | Chong |
| 7,788,107 | B2 | 8/2010 | Oh |
| 8,135,066 | B2 | 3/2012 | Harrison |
| 8,139,773 | B2 | 3/2012 | Oh |
| 8,175,280 | B2 | 5/2012 | Villemoes |
| 8,175,295 | B2 | 5/2012 | Oh |
| 8,194,861 | B2 | 6/2012 | Henn |
| 8,195,318 | B2 | 6/2012 | Oh |
| 8,204,756 | B2 | 6/2012 | Kim et al. |
| 8,223,976 | B2 | 7/2012 | Purnhagen |
| 8,234,122 | B2 | 7/2012 | Kim |
| 8,271,290 | B2 | 9/2012 | Breebaat |
| 8,296,158 | B2 | 10/2012 | Kim |
| 8,315,396 | B2 | 11/2012 | Schreiner |
| 8,364,497 | B2 | 1/2013 | Beack |
| 8,379,868 | B2 | 2/2013 | Goodwin et al. |
| 8,396,575 | B2 | 3/2013 | Kraemer |
| 8,407,060 | B2 | 3/2013 | Hellmuth |
| 8,417,531 | B2 | 4/2013 | Kim et al. |
| 8,515,759 | B2 | 8/2013 | Engdegard |
| 8,620,465 | B2 | 12/2013 | Van Den Berghe et al. |
| 2004/0044527 | A1 | 3/2004 | Thumpudi |
| 2004/0049379 | A1 | 3/2004 | Thumpudi |
| 2005/0074127 | A1 | 4/2005 | Herre |
| 2005/0075873 | A1 | 4/2005 | Makinen |
| 2005/0114121 | A1 | 5/2005 | Tsingos |
| 2005/0157883 | A1 | 7/2005 | Herre et al. |
| 2006/0072623 | A1 | 4/2006 | Park |
| 2008/0008323 | A1 | 1/2008 | Hilpert |
| 2008/0273116 | A1 | 11/2008 | Gentric |
| 2009/0125313 | A1 | 5/2009 | Hellmuth |
| 2009/0210238 | A1 | 8/2009 | Kim |
| 2009/0220095 | A1 | 9/2009 | Oh |
| 2009/0240505 | A1 | 9/2009 | Villemoes |
| 2010/0017002 | A1 | 1/2010 | Oh |
| 2010/0017003 | A1 | 1/2010 | Oh |
| 2010/0076772 | A1 | 3/2010 | Kim |
| 2010/0189266 | A1 | 7/2010 | Oh |
| 2010/0191354 | A1 | 7/2010 | Oh |
| 2010/0219966 | A1 | 9/2010 | Tsukagoshi |
| 2010/0284549 | A1 | 11/2010 | Oh |
| 2011/0013790 | A1 | 1/2011 | Hilpert et al. |
| 2011/0022206 | A1 | 1/2011 | Scharrer |
| 2011/0022402 | A1 | 1/2011 | Engdegard et al. |
| 2011/0081023 | A1 | 4/2011 | Raghuvanshi |
| 2011/0112669 | A1 | 5/2011 | Scharrer |
| 2011/0182432 | A1 | 7/2011 | Ishikawa |
| 2012/0076204 | A1 | 3/2012 | Raveendran |
| 2012/0143613 | A1 | 6/2012 | Herre |
| 2012/0177204 | A1 | 7/2012 | Hellmuth |
| 2012/0182385 | A1 | 7/2012 | Kanamori |
| 2012/0183148 | A1 | 7/2012 | Cho |
| 2012/0213376 | A1 | 8/2012 | Hellmuth et al. |
| 2012/0230497 | A1 | 9/2012 | Dressler |
| 2012/0232910 | A1 | 9/2012 | Dressler |
| 2012/0243690 | A1 | 9/2012 | Engdegard |
| 2012/0259643 | A1 | 10/2012 | Engdegard |
| 2012/0263308 | A1 | 10/2012 | Herre |
| 2012/0269353 | A1 | 10/2012 | Herre |
| 2012/0275609 | A1 | 11/2012 | Beack |
| 2013/0028426 | A1 | 1/2013 | Purnhagen |
| 2014/0023196 | A1 | 1/2014 | Xiang |
| 2014/0025386 | A1 | 1/2014 | Xiang |
| 2014/0297296 | A1 | 10/2014 | Koppens |
| 2015/0287418 | A1 | 10/2015 | Vasilache |
| 2016/0125888 | A1 | 5/2016 | Purnhagen et al. |

FOREIGN PATENT DOCUMENTS

| | | | |
|---|---|---|---|
| CN | 1910655 | B | 11/2010 |
| CN | 101981617 | | 2/2011 |
| CN | 102595303 | | 7/2012 |
| CN | 103109549 | | 5/2013 |
| CN | 101632118 | B | 6/2013 |
| CN | 102428514 | B | 7/2013 |
| CN | 101529501 | B | 8/2013 |
| CN | 102667919 | B | 9/2014 |
| CN | 102687198 | B | 9/2014 |
| CN | 102892070 | B | 2/2016 |
| CN | 101849257 | B | 3/2016 |
| EP | 2273492 | | 1/2011 |
| GB | 2485979 | | 6/2012 |
| KR | 20070037985 | A | 4/2007 |
| RS | 1332 | U | 8/2013 |
| RU | 2406164 | | 12/2010 |
| RU | 2430430 | | 9/2011 |
| RU | 2452043 | | 5/2012 |
| SG | 156390 | B | 2/2010 |
| WO | 2007110823 | A1 | 10/2007 |
| WO | 2008/046530 | | 4/2008 |
| WO | 2008046530 | A2 | 4/2008 |
| WO | 2008/069593 | | 6/2008 |
| WO | 2008/100100 | | 8/2008 |
| WO | 2009/049895 | | 4/2009 |
| WO | 2010/125104 | | 11/2010 |
| WO | 20100143907 | W | 12/2010 |
| WO | 2011/039195 | | 4/2011 |
| WO | 2011061174 | A1 | 5/2011 |
| WO | 2011/102967 | | 8/2011 |
| WO | 2012/125855 | | 9/2012 |
| WO | 2012138819 | A2 | 10/2012 |
| WO | 2013/142657 | | 9/2013 |
| WO | 2014/015299 | | 1/2014 |
| WO | 2014/025752 | | 2/2014 |
| WO | 2014/099285 | | 6/2014 |
| WO | 2014/161993 | | 10/2014 |
| WO | 2014/187986 | | 11/2014 |
| WO | 2014/187988 | | 11/2014 |
| WO | 2014/187989 | | 11/2014 |

OTHER PUBLICATIONS

Boustead, P. et al "DICE: Internet Delivery of Immersive Voice Communication for Crowded Virtual Spaces" IEEE Virtual Reality, Mar. 12-16, 2005, pp. 35-41.

Capobianco, J. et al "Dynamic Strategy for Window Splitting, Parameters Estimation and Interpolation in Spatial Parametric Audio Coders" IEEE International Conference on Acoustics, Speech and Signal Processing, Mar. 25-30, 2012, pp. 397-400.

Cheng, B. et al "A Spatial Squeezing Approach to Ambisonic Audio Compression" IEEE International Conference on Acoustics, Speech and Signal Processing, Mar. 31-Apr. 4, 2008.

Dolby Atmos Next-Generation Audio for Cinema, Apr. 1, 2012 (available at http://www.dolby.com/us/en/professional/cinema/products/dolby-atmos-next- generation-audio-for-cinema-white-paper.pdf.

Engdegard J. et al "Spatial Audio Object Coding (SAOC)—The upcoming MPEG Standard on Parametric Object Based Audio Coding" Journal of the Audio Engineering Society, New York, US, May 17, 2008, pp. 1-16.

Engdegard, J. et al "Spatial Audio Object Coding (SAOC)—The Upcoming MPEG Standard on Parametric Object Based Audio Coding" AES presented at the 124th Convention May 17-20, 2008, Amsterdam, The Netherlands.

(56) References Cited

OTHER PUBLICATIONS

Engdegard, J. et al "Spatial Audio Object Coding (SAOC)—The Upcoming MPEG Standard on Parametric Object Based Audio Coding" AES presented at the 124th Convention, May 17-20, 2008, Amsterdam, pp. 1-15.
Falch, C. et al "Spatial Audio Object Coding with Enhanced Audio Object Separation" Proc. of the 13th Int. Conference on Digital Audio Effects,(DAFx-10) Graz, Austria, Sep. 6-10, 2010, pp. 1-10.
Gorlow, S. et al "Informed Audio Source Separation Using Linearly Constrained Spatial Filters" IEEE Transactions on Audio, Speech and Language Processing, New York, USA, vol. 21, No. 1, Jan. 1, 2013, pp. 3-13.
Herre, J. et al "The Reference Model Architecture for MPEG Spatial Audio Coding" AES convention presented at the 118th Convention, Barcelona, Spain, May 28-31, 2005.
Innami, S. et al "On-Demand Soundscape Generation Using Spatial Audio Mixing" IEEE International Conference on Consumer Electronics, Jan. 9-12, 2011, pp. 29-30.
Innami, S. et al "Super-Realistic Environmental Sound Synthesizer for Location-Based Sound Search System" IEEE Transactions on Consumer Electronics, vol. 57, Issue 4, pp. 1891-1898, Nov. 2011.
ISO/IEC FDIS 23003-2:2010 Information Technology—MPEG Audio Technologies—Part 2: Spatial Audio Object Coding (SAOC) ISO/IEC JTC 1/SC 29/WG 11, Mar. 10, 2010.
Jang, Dae-Young, et al "Object-Based 3D Audio Scene Representation" Audio Engineering Society Convention 115, Oct. 10-13, 2003, pp. 1-6.
Schuijers, E. et al "Low Complexity Parametric Stereo Coding in MPEG-4" AES Convention, paper No. 6073, May 2004.
Stanojevic, T. "Some Technical Possibilities of Using the Total Surround Sound Concept in the Motion Picture Technology", 133rd SMPTE Technical Conference and Equipment Exhibit, Los Angeles Convention Center, Los Angeles, California, Oct. 26-29, 1991.
Stanojevic, T. et al "Designing of TSS Halls" 13th International Congress on Acoustics, Yugoslavia, 1989.
Stanojevic, T. et al "The Total Surround Sound (TSS) Processor" SMPTE Journal, Nov. 1994.
Stanojevic, T. et al "The Total Surround Sound System", 86th AES Convention, Hamburg, Mar. 7-10, 1989.
Stanojevic, T. et al "TSS System and Live Performance Sound" 88th AES Convention, Montreux, Mar. 13-16, 1990.
Stanojevic, T. et al. "TSS Processor" 135th SMPTE Technical Conference, Oct. 29-Nov. 2, 1993, Los Angeles Convention Center, Los Angeles, California, Society of Motion Picture and Television Engineers.
Stanojevic, Tomislav "3-D Sound in Future HDTV Projection Systems" presented at the 132nd SMPTE Technical Conference, Jacob K. Javits Convention Center, New York City, Oct. 13-17, 1990.
Stanojevic, Tomislav "Surround Sound for a New Generation of Theaters, Sound and Video Contractor" Dec. 20, 1995.
Stanojevic, Tomislav, "Virtual Sound Sources in the Total Surround Sound System" Proc. 137th SMPTE Technical Conference and World Media Expo, Sep. 6-9, 1995, New Orleans Convention Center, New Orleans, Louisiana.
Tsingos, N. et al "Perceptual Audio Rendering of Complex Virtual Environments" ACM Transactions on Graphics, vol. 23, No. 3, Aug. 1, 2004, pp. 249-258.
Wei Feiyu "AC3 Audio Decoding Processing Based on MIPS Embedded System" Dec. 15, 2011, Chinese Master's Theses Issue 12.

DECODING OF AUDIO SCENES

CROSS REFERENCE TO RELATED APPLICATIONS

This application is a continuation of U.S. patent application Ser. No. 17/724,325, filed Apr. 19, 2022, which is a continuation of U.S. patent application Ser. No. 16/938,527, filed Jul. 24, 2020 (now issued as U.S. Pat. No. 11,315,577), which is a divisional of U.S. patent application Ser. No. 16/580,898, filed Sep. 24, 2019 (now issued as U.S. Pat. No. 10,726,853), which is a continuation of U.S. patent application Ser. No. 16/367,570, filed Mar. 28, 2019 (now issued as U.S. Pat. No. 10,468,039), which is a continuation of U.S. patent application Ser. No. 16/015,103, filed Jun. 21, 2018 (now issued as U.S. Pat. No. 10,347,261), which is a continuation of U.S. patent application Ser. No. 14/893,852, filed Nov. 24, 2015 (now issued as U.S. Pat. No. 10,026,408), which in turn is the 371 national stage of PCT/EP2014/060727, filed May 23, 2014. PCT/EP2014/060727 claims priority to U.S. Provisional Patent Application No. 61/827,246, filed on May 24, 2013, each of which is hereby incorporated by reference in its entirety.

TECHNICAL FIELD

The invention disclosed herein generally relates to the field of encoding and decoding of audio. In particular it relates to encoding and decoding of an audio scene represented by audio signals.

BACKGROUND

There exist audio coding systems for parametric spatial audio coding. For example, MPEG Surround describes a system for parametric spatial coding of multichannel audio. MPEG SAOC (Spatial Audio Object Coding) describes a system for parametric coding of audio objects.

On an encoder side these systems typically downmix the channels/objects into a downmix, which typically is a mono (one channel) or a stereo (two channels) downmix, and extract side information describing the properties of the channels/objects by means of parameters like level differences and cross-correlation. The downmix and the side information are then encoded and sent to a decoder side. At the decoder side, the channels/objects are reconstructed, i.e. approximated, from the downmix under control of the parameters of the side information.

A drawback of these systems is that the reconstruction is typically mathematically complex and often has to rely on assumptions about properties of the audio content that is not explicitly described by the parameters sent as side information. Such assumptions may for example be that the channels/objects are considered to be uncorrelated unless a cross-correlation parameter is sent, or that the downmix of the channels/objects is generated in a specific way. Further, the mathematically complexity and the need for additional assumptions increase dramatically as the number of channels of the downmix increases.

Furthermore, the required assumptions are inherently reflected in algorithmic details of the processing applied on the decoder side. This implies that quite a lot of intelligence has to be included on the decoder side. This is a drawback in that it may be difficult to upgrade or modify the algorithms once the decoders are deployed in e.g. consumer devices that are difficult or even impossible to upgrade.

BRIEF DESCRIPTION OF THE DRAWINGS

In what follows, example embodiments will be described in greater detail and with reference to the accompanying drawings, on which.

All the figures are schematic and generally only show parts which are necessary in order to elucidate the invention, whereas other parts may be omitted or merely suggested. Unless otherwise indicated, like reference numerals refer to like parts in different figures.

DETAILED DESCRIPTION

Figure 1:
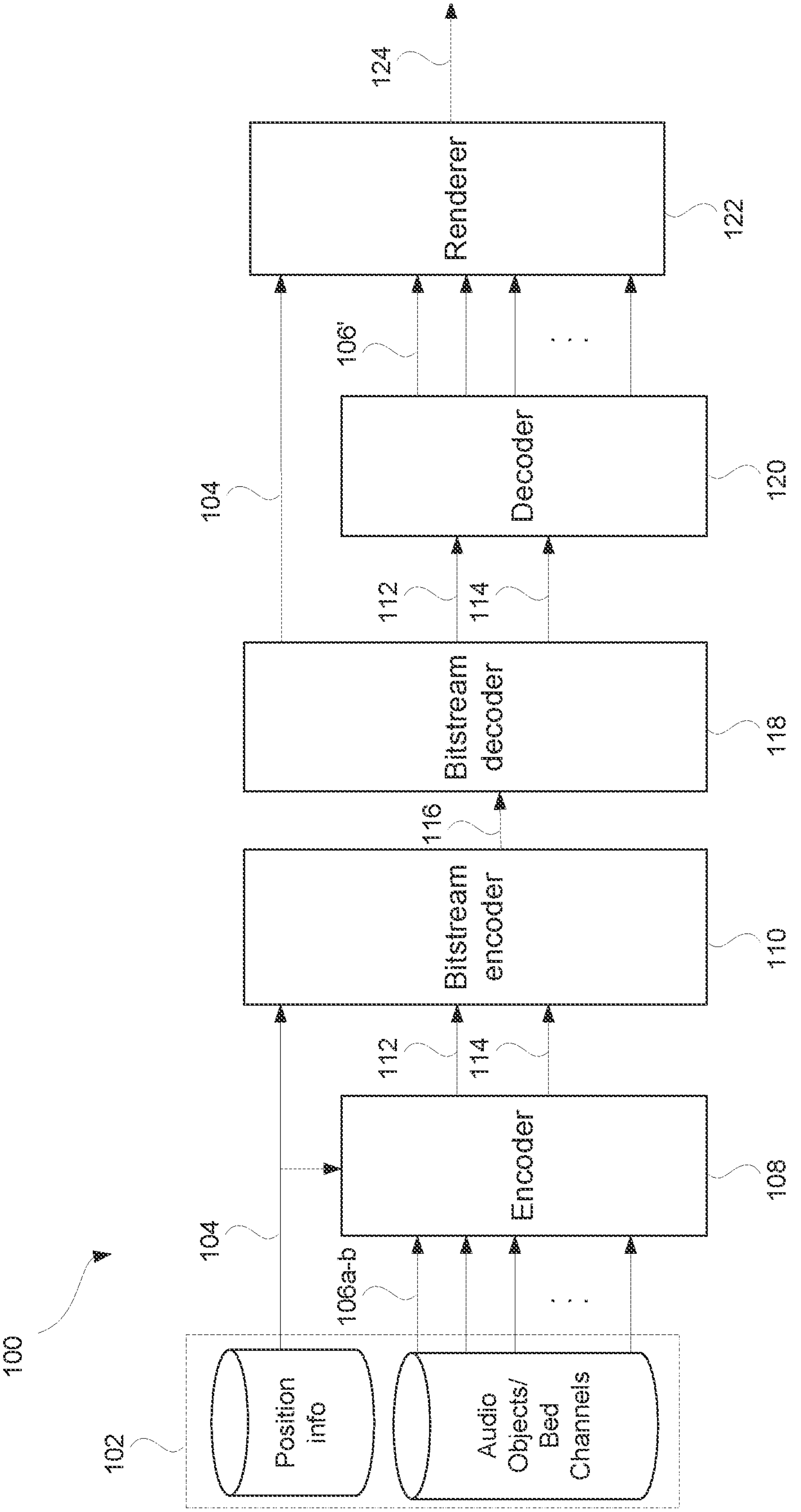
FIG. 1 is a schematic drawing of an audio encoding/decoding system according to example embodiments.

In view of the above it is an object to provide an encoder and a decoder and associated methods which provide less complex and more flexible reconstruction of audio objects.

I. Overview—Encoder

According to a first aspect, example embodiments propose encoding methods, encoders, and computer program products for encoding. The proposed methods, encoders and computer program products may generally have the same features and advantages.

According to example embodiments there is provided a method for encoding a time/frequency tile of an audio scene which at least comprises N audio objects. The method comprises: receiving the N audio objects; generating M downmix signals based on at least the N audio objects; generating a reconstruction matrix with matrix elements that enables reconstruction of at least the N audio objects from the M downmix signals; and generating a bit stream comprising the M downmix signals and at least some of the matrix elements of the reconstruction matrix.

The number N of audio objects may be equal to or greater than one. The number M of downmix signals may be equal to or greater than one.

With this method a bit stream is thus generated which comprises M downmix signals and at least some of the matrix elements of a reconstruction matrix as side information. By including individual matrix elements of the reconstruction matrix in the bit stream, very little intelligence is required on the decoder side. For example, there is no need on the decoder side for complex computation of the reconstruction matrix based on the transmitted object parameters and additional assumptions. Thus, the mathematical complexity at the decoder side is significantly reduced. Moreover, the flexibility concerning the number of downmix signals is increased compared to prior art methods since the complexity of the method is not dependent on the number of downmix signals used.

As used herein audio scene generally refers to a three-dimensional audio environment which comprises audio elements being associated with positions in a three-dimensional space that can be rendered for playback on an audio system.

As used herein audio object refers to an element of an audio scene. An audio object typically comprises an audio signal and additional information such as the position of the object in a three-dimensional space. The additional information is typically used to optimally render the audio object on a given playback system.

As used herein a downmix signal refers to a signal which is a combination of at least the N audio objects. Other signals of the audio scene, such as bed channels (to be described below), may also be combined into the downmix signal. For example, the M downmix signals may correspond to a rendering of the audio scene to a given loudspeaker configuration, e.g. a standard 5.1 configuration. The number of downmix signals, here denoted by M, is typically (but not necessarily) less than the sum of the number of audio objects and bed channels, explaining why the M downmix signals are referred to as a downmix.

Audio encoding/decoding systems typically divide the time-frequency space into time/frequency tiles, e.g. by applying suitable filter banks to the input audio signals. By a time/frequency tile is generally meant a portion of the time-frequency space corresponding to a time interval and a frequency sub-band. The time interval may typically correspond to the duration of a time frame used in the audio encoding/decoding system. The frequency sub-band may typically correspond to one or several neighboring frequency sub-bands defined by the filter bank used in the encoding/decoding system. In the case the frequency sub-band corresponds to several neighboring frequency sub-bands defined by the filter bank, this allows for having non-uniform frequency sub-bands in the decoding process of the audio signal, for example wider frequency sub-bands for higher frequencies of the audio signal. In a broadband case, where the audio encoding/decoding system operates on the whole frequency range, the frequency sub-band of the time/frequency tile may correspond to the whole frequency range. The above method discloses the encoding steps for encoding an audio scene during one such time/frequency tile. However, it is to be understood that the method may be repeated for each time/frequency tile of the audio encoding/decoding system. Also it is to be understood that several time/frequency tiles may be encoded simultaneously. Typically, neighboring time/frequency tiles may overlap a bit in time and/or frequency. For example, an overlap in time may be equivalent to a linear interpolation of the elements of the reconstruction matrix in time, i.e. from one time interval to the next. However, this disclosure targets other parts of encoding/decoding system and any overlap in time and/or frequency between neighboring time/frequency tiles is left for the skilled person to implement.

According to exemplary embodiments the M downmix signals are arranged in a first field of the bit stream using a first format, and the matrix elements are arranged in a second field of the bit stream using a second format, thereby allowing a decoder that only supports the first format to decode and playback the M downmix signals in the first field and to discard the matrix elements in the second field. This is advantageous in that the M downmix signals in the bit stream are backwards compatible with legacy decoders that do not implement audio object reconstruction. In other words, legacy decoders may still decode and playback the M downmix signals of the bitstream, for example by mapping each downmix signal to a channel output of the decoder.

According to exemplary embodiments, the method may further comprise the step of receiving positional data corresponding to each of the N audio objects, wherein the M downmix signals are generated based on the positional data. The positional data typically associates each audio object with a position in a three-dimensional space. The position of the audio object may vary with time. By using the positional data when downmixing the audio objects, the audio objects will be mixed in the M downmix signals in such a way that if the M downmix signals for example are listened to on a system with M output channels, the audio objects will sound as if they were approximately placed at their respective positions. This is for example advantageous if the M downmix signals are to be backwards compatible with a legacy decoder.

According to exemplary embodiments, the matrix elements of the reconstruction matrix are time and frequency variant. In other words, the matrix elements of the reconstruction matrix may be different for different time/frequency tiles. In this way a great flexibility in the reconstruction of the audio objects is achieved.

According to exemplary embodiments the audio scene further comprises a plurality of bed channels. This is for example common in cinema audio applications where the audio content comprises bed channels in addition to audio objects. In such cases the M downmix signals may be generated based on at least the N audio objects and the plurality of bed channels. By a bed channel is generally meant an audio signal which corresponds to a fixed position in the three-dimensional space. For example, a bed channel may correspond to one of the output channels of the audio encoding/decoding system. As such, a bed channel may be interpreted as an audio object having an associated position in a three-dimensional space being equal to the position of one of the output speakers of the audio encoding/decoding system. A bed channel may therefore be associated with a label which merely indicates the position of the corresponding output speaker.

When the audio scene comprises bed channels, the reconstruction matrix may comprise matrix elements which enable reconstruction of the bed channels from the M downmix signals.

In some situations, the audio scene may comprise a vast number of objects. In order to reduce the complexity and the amount of data required to represent the audio scene, the audio scene may be simplified by reducing the number of audio objects. Thus, if the audio scene originally comprises K audio objects, wherein K>N, the method may further comprise the steps of receiving the K audio objects, and reducing the K audio objects into the N audio objects by clustering the K objects into N clusters and representing each cluster by one audio object.

In order to simplify the scene the method may further comprise the step of receiving positional data corresponding to each of the K audio objects, wherein the clustering of the K objects into N clusters is based on a positional distance between the K objects as given by the positional data of the K audio objects. For example, audio objects which are close to each other in terms of position in the three-dimensional space may be clustered together.

As discussed above, exemplary embodiments of the method are flexible with respect to the number of downmix signals used. In particular, the method may advantageously be used when there are more than two downmix signals, i.e. when M is larger than two. For example, five or seven downmix signals corresponding to conventional 5.1 or 7.1 audio setups may be used. This is advantageous since, in contrast to prior art systems, the mathematical complexity of the proposed coding principles remains the same regardless of the number of downmix signals used.

In order to further enable improved reconstruction of the N audio objects, the method may further comprise: forming L auxiliary signals from the N audio objects; including matrix elements in the reconstruction matrix that enable reconstruction of at least the N audio objects from the M downmix signals and the L auxiliary signals; and including the L auxiliary signals in the bit stream. The auxiliary signals thus serves as help signals that for example may capture aspects of the audio objects that is difficult to reconstruct from the downmix signals. The auxiliary signals may further be based on the bed channels. The number of auxiliary signals may be equal to or greater than one.

According to one exemplary embodiment, the auxiliary signals may correspond to particularly important audio objects, such as an audio object representing dialogue. Thus at least one of the L auxiliary signals may be equal to one of the N audio objects. This allows the important objects to be rendered at higher quality than if they would have to be reconstructed from the M downmix channels only. In practice, some of the audio objects may have been prioritized and/or labeled by a audio content creator as the audio objects that preferably are individually included as auxiliary objects. Furthermore, this makes modification/processing of these objects prior to rendering less prone to artifacts. As a compromise between bit rate and quality, it is also possible to send a mix of two or more audio objects as an auxiliary signal. In other words, at least one of the L auxiliary signals may be formed as a combination of at least two of the N audio objects.

According to one exemplary embodiment, the auxiliary signals represent signal dimensions of the audio objects that got lost in the process of generating the M downmix signals, e.g. since the number of independent objects typically is higher than the number of downmix channels or since two objects are associated with such positions that they are mixed in the same downmix signal. An example of the latter case is a situation where two objects are only vertically separated but share the same position when projected on the horizontal plane, which means that they typically will be rendered to the same downmix channel(s) of a standard 5.1 surround loudspeaker setup, where all speakers are in the same horizontal plane. Specifically, the M downmix signals span a hyperplane in a signal space. By forming linear combinations of the M downmix signals only audio signals that lie in the hyperplane may be reconstructed. In order to improve the reconstruction, auxiliary signals may be included that do not lie in the hyperplane, thereby also allowing reconstruction of signals that do not lie in the hyperplane. In other words, according to exemplary embodiments, at least one of the plurality of auxiliary signals does not lie in the hyperplane spanned by the M downmix signals. For example, at least one of the plurality of auxiliary signals may be orthogonal to the hyperplane spanned by the M downmix signals.

According to example embodiments there is provided a computer-readable medium comprising computer code instructions adapted to carry out any method of the first aspect when executed on a device having processing capability.

According to example embodiments there is provided an encoder for encoding a time/frequency tile of an audio scene which at least comprises N audio objects, comprising: a receiving component configured to receive the N audio objects; a downmix generating component configured to receive the N audio objects from the receiving component and to generate M downmix signals based on at least the N audio objects; an analyzing component configured to generate a reconstruction matrix with matrix elements that enables reconstruction of at least the N audio objects from the M downmix signals; and a bit stream generating component configured to receive the M downmix signals from the downmix generating component and the reconstruction matrix from the analyzing component and to generate a bit stream comprising the M downmix signals and at least some of the matrix elements of the reconstruction matrix.

II. Overview—Decoder

According to a second aspect, example embodiments propose decoding methods, decoding devices, and computer program products for decoding. The proposed methods, devices and computer program products may generally have the same features and advantages.

Advantages regarding features and setups as presented in the overview of the encoder above may generally be valid for the corresponding features and setups for the decoder.

According to exemplary embodiments, there is provided a method for decoding a time-frequency tile of an audio scene which at least comprises N audio objects, the method comprising the steps of: receiving a bit stream comprising M downmix signals and at least some matrix elements of a reconstruction matrix; generating the reconstruction matrix using the matrix elements; and reconstructing the N audio objects from the M downmix signals using the reconstruction matrix.

According to exemplary embodiments, the M downmix signals are arranged in a first field of the bit stream using a first format, and the matrix elements are arranged in a second field of the bit stream using a second format, thereby allowing a decoder that only supports the first format to decode and playback the M downmix signals in the first field and to discard the matrix elements in the second field.

According to exemplary embodiments the matrix elements of the reconstruction matrix are time and frequency variant.

According to exemplary embodiments the audio scene further comprises a plurality of bed channels, the method further comprising reconstructing the bed channels from the M downmix signals using the reconstruction matrix.

According to exemplary embodiments the number M of downmix signals is larger than two.

According to exemplary embodiments, the method further comprises: receiving L auxiliary signals being formed from the N audio objects; reconstructing the N audio objects from the M downmix signals and the L auxiliary signals using the reconstruction matrix, wherein the reconstruction matrix comprises matrix elements that enable reconstruction of at least the N audio objects from the M downmix signals and the L auxiliary signals.

According to exemplary embodiments at least one of the L auxiliary signals is equal to one of the N audio objects.

According to exemplary embodiments at least one of the L auxiliary signals is a combination of the N audio objects.

According to exemplary embodiments, the M downmix signals span a hyperplane, and wherein at least one of the plurality of auxiliary signals does not lie in the hyperplane spanned by the M downmix signals.

According to exemplary embodiments, the at least one of the plurality of auxiliary signals that does not lie in the hyperplane is orthogonal to the hyperplane spanned by the M downmix signals.

As discussed above, audio encoding/decoding systems typically operate in the frequency domain. Thus, audio encoding/decoding systems perform time/frequency transforms of audio signals using filter banks. Different types of time/frequency transforms may be used. For example the M downmix signals may be represented with respect to a first frequency domain and the reconstruction matrix may be represented with respect to a second frequency domain. In order to reduce the computational burden in the decoder, it is advantageous to choose the first and the second frequency domains in a clever manner. For example, the first and the second frequency domain could be chosen as the same frequency domain, such as a Modified Discrete Cosine Transform (MDCT) domain. In this way one can avoid transforming the M downmix signals from the first frequency domain to the time domain followed by a transformation to the second frequency domain in the decoder. Alternatively it may be possible to choose the first and the second frequency domains in such a way that the transform from the first frequency domain to the second frequency domain can be implemented jointly such that it is not necessary to go all the way via the time domain in between.

The method may further comprise receiving positional data corresponding to the N audio objects, and rendering the N audio objects using the positional data to create at least one output audio channel. In this way the reconstructed N audio objects are mapped on the output channels of the audio encoder/decoder system based on their position in the three-dimensional space.

The rendering is preferably performed in a frequency domain. In order to reduce the computational burden in the decoder, the frequency domain of the rendering is preferably chosen in a clever way with respect to the frequency domain in which the audio objects are reconstructed. For example, if the reconstruction matrix is represented with respect to a second frequency domain corresponding to a second filter bank, and the rendering is performed in a third frequency domain corresponding to a third filter bank, the second and the third filter banks are preferably chosen to at least partly be the same filter bank. For example, the second and the third filter bank may comprise a Quadrature Mirror Filter (QMF) domain. Alternatively, the second and the third frequency domain may comprise an MDCT filter bank. According to an example embodiment, the third filter bank may be composed of a sequence of filter banks, such as a QMF filter bank followed by a Nyquist filter bank. If so, at least one of the filter banks of the sequence (the first filter bank of the sequence) is equal to the second filter bank. In this way, the second and the third filter bank may be said to at least partly be the same filter bank.

According to exemplary embodiments, there is provided a computer-readable medium comprising computer code instructions adapted to carry out any method of the second aspect when executed on a device having processing capability.

According to exemplary embodiments, there is provided a decoder for decoding a time-frequency tile of an audio scene which at least comprises N audio objects, comprising: a receiving component configured to receive a bit stream comprising M downmix signals and at least some matrix elements of a reconstruction matrix; a reconstruction matrix generating component configured to receive the matrix elements from the receiving component and based thereupon generate the reconstruction matrix; and a reconstructing component configured to receive the reconstruction matrix from the reconstruction matrix generating component and to reconstruct the N audio objects from the M downmix signals using the reconstruction matrix.

According to exemplary embodiments a method for decoding an audio scene, non-transitory computer-readable medium comprising computer code instructions to perform the method or an apparatus configured to perform the method may be disclosed. The method may include receiving a bit stream comprising information for determining M downmix signals and a reconstruction matrix. It may further include generating the reconstruction matrix; and reconstructing N audio objects from the M downmix signals using the reconstruction matrix. The reconstructing takes place in a frequency domain. The matrix elements of the reconstruction matrix are applied as coefficients in the linear combinations to the at least M downmix signals, and the matrix elements are based on the N audio objects.

III. Example Embodiments

FIG. 1 illustrates an encoding/decoding system 100 for encoding/decoding of an audio scene 102. The encoding/decoding system 100 comprises an encoder 108, a bit stream generating component 110, a bit stream decoding component 118, a decoder 120, and a renderer 122.

The audio scene 102 is represented by one or more audio objects 106*a*, i.e. audio signals, such as N audio objects. The audio scene 102 may further comprise one or more bed channels 106*b*, i.e. signals that directly correspond to one of the output channels of the renderer 122. The audio scene 102 is further represented by metadata comprising positional information 104. The positional information 104 is for example used by the renderer 122 when rendering the audio scene 102. The positional information 104 may associate the audio objects 106*a*, and possibly also the bed channels 106*b*, with a spatial position in a three dimensional space as a function of time. The metadata may further comprise other type of data which is useful in order to render the audio scene 102.

The encoding part of the system 100 comprises the encoder 108 and the bit stream generating component 110. The encoder 108 receives the audio objects 106*a*, the bed channels 106*b* if present, and the metadata comprising positional information 104. Based thereupon, the encoder 108 generates one or more downmix signals 112, such as M downmix signals. By way of example, the downmix signals 112 may correspond to the channels [Lf Rf Cf Ls Rs LFE] of a 5.1 audio system. ("L" stands for left, "R" stands for right, "C" stands for center, "f" stands for front, "s" stands for surround, and "LFE" for low frequency effects).

The encoder 108 further generates side information. The side information comprises a reconstruction matrix. The reconstruction matrix comprises matrix elements 114 that enable reconstruction of at least the audio objects 106*a* from the downmix signals 112. The reconstruction matrix may further enable reconstruction of the bed channels 106*b*.

The encoder 108 transmits the M downmix signals 112, and at least some of the matrix elements 114 to the bit stream generating component 110. The bit stream generating component 110 generates a bit stream 116 comprising the M downmix signals 112 and at least some of the matrix elements 114 by performing quantization and encoding. The bit stream generating component 110 further receives the metadata comprising positional information 104 for inclusion in the bit stream 116.

The decoding part of the system comprises the bit stream decoding component 118 and the decoder 120. The bit stream decoding component 118 receives the bit stream 116 and performs decoding and dequantization in order to extract the M downmix signals 112 and the side information comprising at least some of the matrix elements 114 of the reconstruction matrix. The M downmix signals 112 and the matrix elements 114 are then input to the decoder 120 which based thereupon generates a reconstruction 106' of the N audio objects 106*a* and possibly also the bed channels 106*b*. The reconstruction 106' of the N audio objects is hence an approximation of the N audio objects 106*a* and possibly also of the bed channels 106*b*.

By way of example, if the downmix signals 112 correspond to the channels [Lf Rf Cf Ls Rs LFE] of a 5.1 configuration, the decoder 120 may reconstruct the objects 106' using only the full-band channels [Lf Rf Cf Ls Rs], thus ignoring the LFE. This also applies to other channel configurations. The LFE channel of the downmix 112 may be sent (basically unmodified) to the renderer 122.

The reconstructed audio objects 106', together with the positional information 104, are then input to the renderer 122. Based on the reconstructed audio objects 106' and the positional information 104, the renderer 122 renders an output signal 124 having a format which is suitable for playback on a desired loudspeaker or headphones configuration. Typical output formats are a standard 5.1 surround setup (3 front loudspeakers, 2 surround loud speakers, and 1 low frequency effects, LFE, loudspeaker) or a 7.1+4 setup (3 front loudspeakers, 4 surround loud speakers, 1 LFE loudspeaker, and 4 elevated speakers).

In some embodiments, the original audio scene may comprise a large number of audio objects. Processing of a large number of audio objects comes at the cost of high computational complexity. Also the amount of side information (the positional information 104 and the reconstruction matrix elements 114) to be embedded in the bit stream 116 depends on the number of audio objects. Typically the amount of side information grows linearly with the number of audio objects. Thus, in order to save computational complexity and/or to reduce the bitrate needed to encode the audio scene, it may be advantageous to reduce the number of audio objects prior to encoding. For this purpose the audio encoder/decoder system 100 may further comprise a scene simplification module (not shown) arranged upstreams of the encoder 108. The scene simplification module takes the original audio objects and possibly also the bed channels as input and performs processing in order to output the audio objects 106*a*. The scene simplification module reduces the number, K say, of original audio objects to a more feasible number N of audio objects 106*a* by performing clustering. More precisely, the scene simplification module organizes the K original audio objects and possibly also the bed channels into N clusters. Typically, the clusters are defined based on spatial proximity in the audio scene of the K original audio objects/bed channels. In order to determine the spatial proximity, the scene simplification module may take positional information of the original audio objects/bed channels as input. When the scene simplification module has formed the N clusters, it proceeds to represent each cluster by one audio object. For example, an audio object representing a cluster may be formed as a sum of the audio objects/bed channels forming part of the cluster. More specifically, the audio content of the audio objects/bed channels may be added to generate the audio content of the representative audio object. Further, the positions of the audio objects/bed channels in the cluster may be averaged to give a position of the representative audio object. The scene simplification module includes the positions of the representative audio objects in the positional data 104. Further, the scene simplification module outputs the representative audio objects which constitute the N audio objects 106*a* of FIG. 1.

The M downmix signals 112 may be arranged in a first field of the bit stream 116 using a first format. The matrix elements 114 may be arranged in a second field of the bit stream 116 using a second format. In this way, a decoder that only supports the first format is able to decode and playback the M downmix signals 112 in the first field and to discard the matrix elements 114 in the second field.

The audio encoder/decoder system 100 of FIG. 1 supports both the first and the second format. More precisely, the decoder 120 is configured to interpret the first and the second formats, meaning that it is capable of reconstructing the objects 106' based on the M downmix signals 112 and the matrix elements 114.

Figure 2:
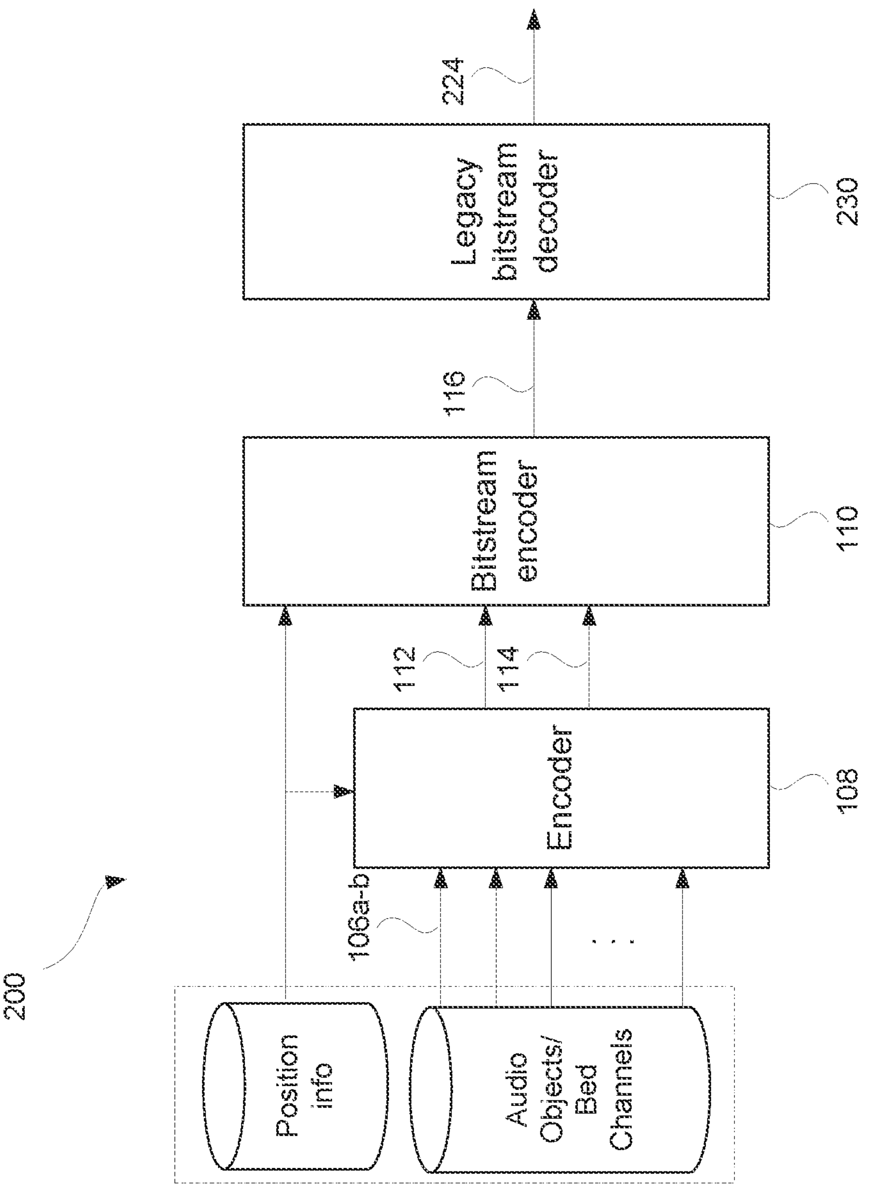
FIG. 2 is a schematic drawing of an audio encoding/decoding system having a legacy decoder according to example embodiments.

FIG. 2 illustrates an audio encoder/decoder system 200. The encoding part 108, 110 of the system 200 corresponds to that of FIG. 1. However, the decoding part of the audio encoder/decoder system 200 differs from that of the audio encoder/decoder system 100 of FIG. 1. The audio encoder/decoder system 200 comprises a legacy decoder 230 which supports the first format but not the second format. Thus, the legacy decoder 230 of the audio encoder/decoder system 200 is not capable of reconstructing the audio objects/bed channels 106*a-b*. However, since the legacy decoder 230 supports the first format, it may still decode the M downmix signals 112 in order to generate an output 224 which is a channel based representation, such as a 5.1 representation, suitable for direct playback over a corresponding multichannel loudspeaker setup. This property of the downmix signals is referred to as backwards compatibility meaning that also a legacy decoder which does not support the second format, i.e. is uncapable of interpreting the side information comprising the matrix elements 114, may still decode and playback the M downmix signals 112.

Figure 3:
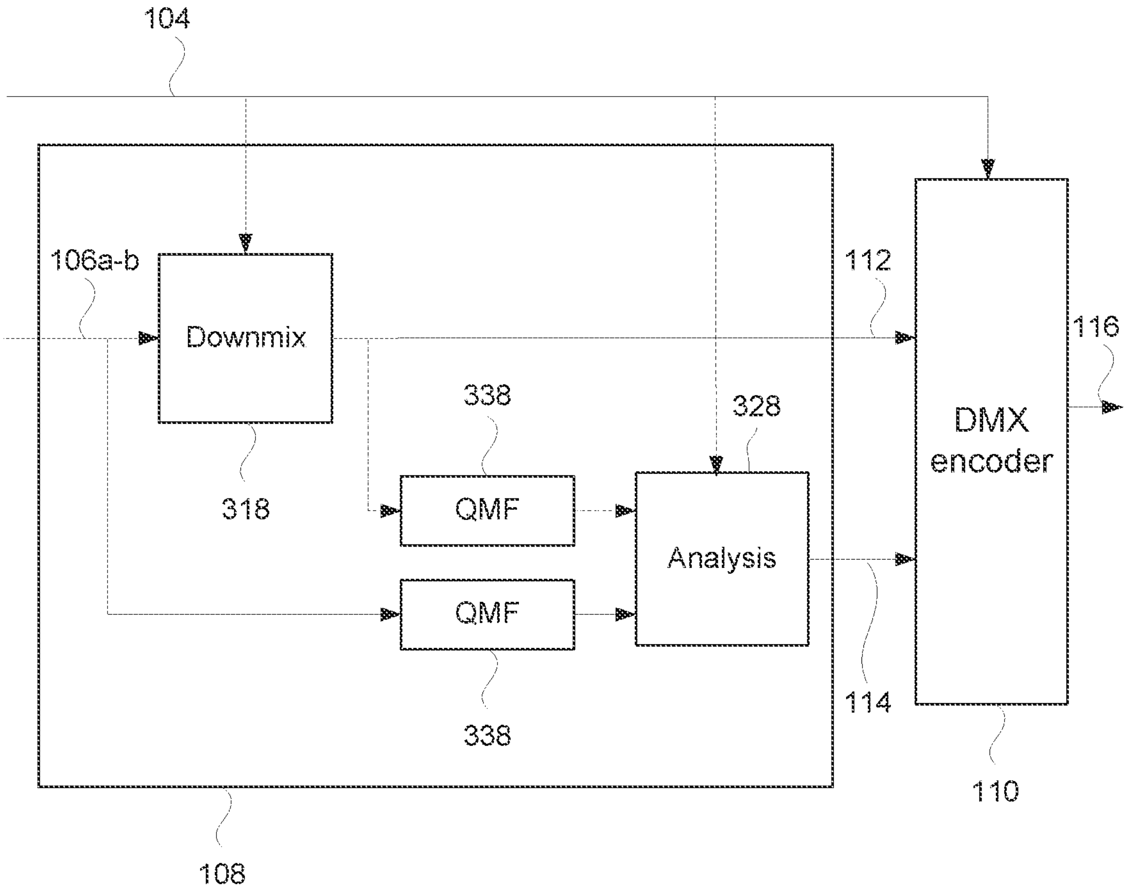
FIG. 3 is a schematic drawing of an encoding side of an audio encoding/decoding system according to example embodiments.

The operation on the encoder side of the audio encoding/decoding system 100 will now be described in more detail with reference to FIG. 3 and the flowchart of FIG. 4.

Figure 4:
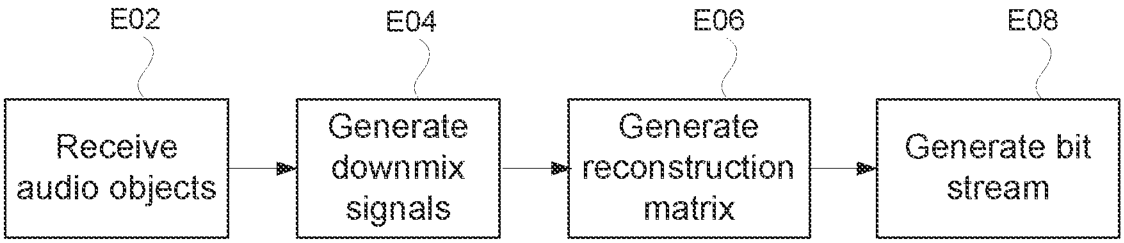
FIG. 4 is a flow chart of an encoding method according to example embodiments.

FIG. 4 illustrates the encoder 108 and the bit stream generating component 110 of FIG. 1 in more detail. The encoder 108 has a receiving component (not shown), a downmix generating component 318 and an analyzing component 328.

In step E02, the receiving component of the encoder 108 receives the N audio objects 106*a* and the bed channels 106*b* if present. The encoder 108 may further receive the positional data 104. Using vector notation the N audio objects may be denoted by a vector $S=[S1\ S2\ \ldots\ SN]^T$, and the bed channels by a vector B. The N audio objects and the bed channels may together be represented by a vector $A=[B^T\ S^T]^T$.

In step E04, the downmix generating component 318 generates M downmix signals 112 from the N audio objects 106*a* and the bed channels 106*b* if present. Using vector notation, the M downmix signals may be represented by a vector $D=[D1\ D2\ \ldots\ DM]^T$ comprising the M downmix signals. Generally a downmix of a plurality of signals is a combination of the signals, such as a linear combination of the signals. By way of example, the M downmix signals may correspond to a particular loudspeaker configuration, such as the configuration of the loudspeakers [Lf Rf Cf Ls Rs LFE] in a 5.1 loudspeaker configuration.

The downmix generating component 318 may use the positional information 104 when generating the M downmix signals, such that the objects will be combined into the different downmix signals based on their position in a three-dimensional space. This is particularly relevant when the M downmix signals themselves correspond to a specific loudspeaker configuration as in the above example. By way of example, the downmix generating component 318 may derive a presentation matrix Pd (corresponding to a presentation matrix applied in the renderer 122 of FIG. 1) based on the positional information and use it to generate the downmix according to $D=Pd*[B^T S^T]^T$.

The N audio objects 106*a* and the bed channels 106*b* if present are also input to the analyzing component 328. The analyzing component 328 typically operates on individual time/frequency tiles of the input audio signals 106*a-b*. For this purpose, the N audio objects 106*a* and the bed channels 106*b* may be fed through a filter bank 338, e.g. a QMF bank, which performs a time to frequency transform of the input audio signals 106*a-b*. In particular, the filter bank 338 is associated with a plurality of frequency sub-bands. The frequency resolution of a time/frequency tile corresponds to one or more of these frequency sub-bands. The frequency resolution of the time/frequency tiles may be non-uniform, i.e. it may vary with frequency. For example, a lower frequency resolution may be used for high frequencies, meaning that a time/frequency tile in the high frequency range may corresponds to several frequency sub-bands as defined by the filter bank 338.

In step E06, the analyzing component 328 generates a reconstruction matrix, here denoted by R1. The generated reconstruction matrix is composed of a plurality of matrix elements. The reconstruction matrix R1 is such that is allows reconstruction of (an approximation) of the audio objects N 106*a* and possibly also the bed channels 106*b* from the M downmix signals 112 in the decoder.

The analyzing component 328 may take different approaches to generate the reconstruction matrix. For example, a Minimum Mean Squared Error (MMSE) predictive approach can be used which takes both the N audio objects/bed channels 106*a-b* as input as well as the M downmix signals 112 as input. This can be described as an approach which aims at finding the reconstruction matrix that minimizes the mean squared error of the reconstructed audio objects/bed channels. Particularly, the approach reconstructs the N audio objects/bed channels using a candidate reconstruction matrix and compares them to the input audio objects/bed channels 106*a-b* in terms of the mean squared error. The candidate reconstruction matrix that minimizes the mean squared error is selected as the reconstruction matrix and its matrix elements 114 are output of the analyzing component 328.

The MMSE approach requires estimates of correlation and covariance matrices of the N audio objects/bed channels 106*a-b* and the M downmix signals 112. According to the above approach, these correlations and covariances are measured based on the N audio objects/bed channels 106*a-b* and the M downmix signals 112. In an alternative, model-based, approach the analyzing component 328 takes the positional data 104 as input instead of the M downmix signals 112. By making certain assumptions, e.g. assuming that the N audio objects are mutually uncorrelated, and using this assumption in combination with the downmix rules applied in the downmix generating component 318, the analyzing component 328 may compute the required correlations and covariances needed to carry out the MMSE method described above.

The elements of the reconstruction matrix 114 and the M downmix signals 112 are then input to the bit stream generating component 110. In step E08, the bit stream generating component 110 quantizes and encodes the M downmix signals 112 and at least some of the matrix elements 114 of the reconstruction matrix and arranges them in the bit stream 116. In particular, the bit stream generating component 110 may arrange the M downmix signals 112 in a first field of the bit stream 116 using a first format. Further, the bit stream generating component 110 may arrange the matrix elements 114 in a second field of the bit stream 116 using a second format. As previously described with reference to FIG. 2, this allows a legacy decoder that only supports the first format to decode and playback the M downmix signals 112 and to discard the matrix elements 114 in the second field.

Figure 5:
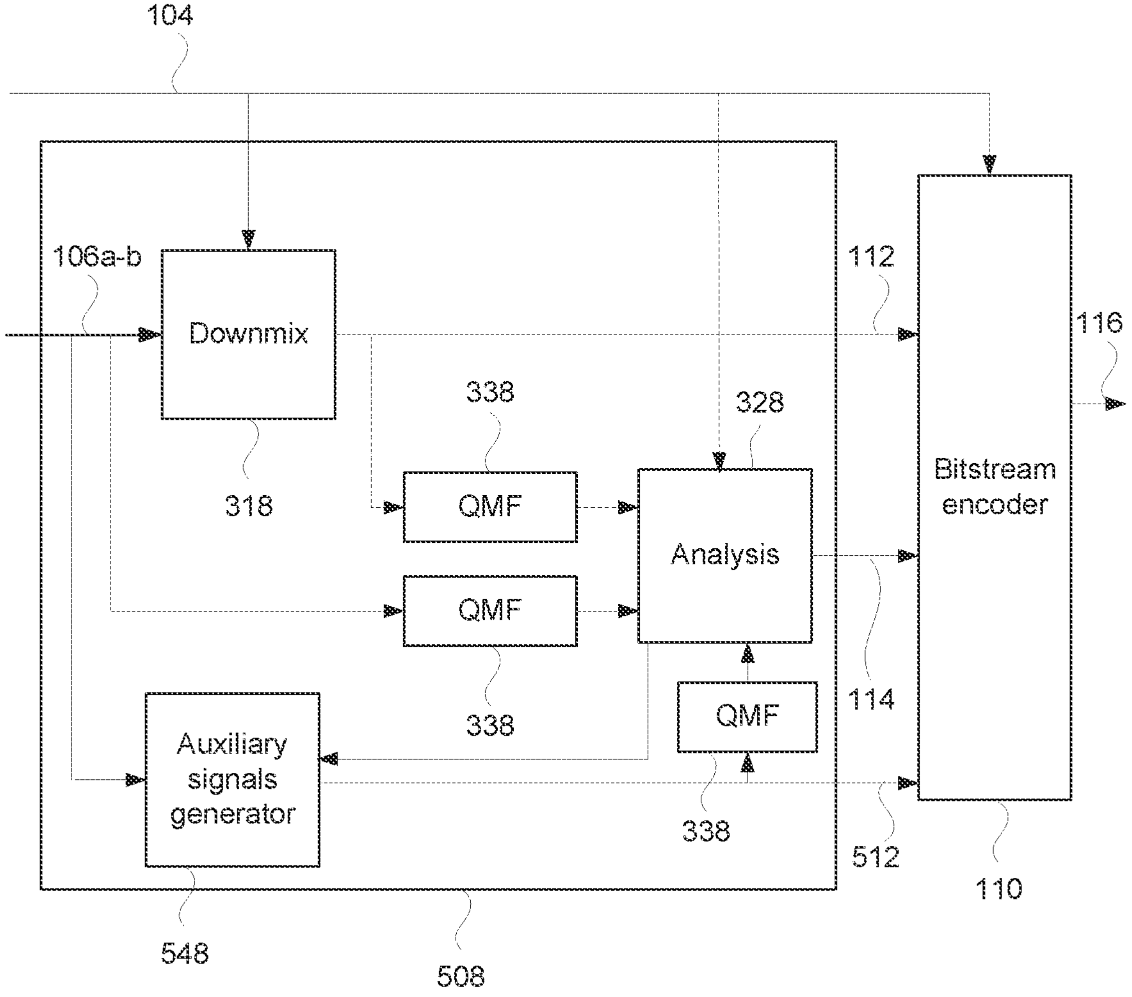
FIG. 5 is a schematic drawing of an encoder according to example embodiments.

FIG. 5 illustrates an alternative embodiment of the encoder 108. Compared to the encoder shown in FIG. 3, the encoder 508 of FIG. 5 further allows one or more auxiliary signals to be included in the bit stream 116.

For this purpose, the encoder 508 comprises an auxiliary signals generating component 548. The auxiliary signals generating component 548 receives the audio objects/bed channels 106*a-b* and based thereupon one or more auxiliary signals 512 are generated. The auxiliary signals generating component 548 may for example generate the auxiliary signals 512 as a combination of the audio objects/bed channels 106*a-b*. Denoting the auxiliary signals by the vector $C=[C1\ C2\ \ldots\ CL]^T$, the auxiliary signals may be generated as $C=Q*[B^T S^T]^T$, where Q is a matrix which can be time and frequency variant. This includes the case where the auxiliary signals equals one or more of the audio objects and where the auxiliary signals are linear combinations of the audio objects. For example, the auxiliary signal could represent be a particularly important object, such as dialogue.

The role of the auxiliary signals 512 is to improve the reconstruction of the audio objects/bed channels 106*a-b* in the decoder. More precisely, on the decoder side, the audio objects/bed channels 106*a-b* may be reconstructed based on the M downmix signals 112 as well as the L auxiliary signals 512. The reconstruction matrix will therefore comprises matrix elements 114 which allow reconstruction of the audio objects/bed channels from the M downmix signals 112 as well as the L auxiliary signals.

The L auxiliary signals 512 may therefore be input to the analyzing component 328 such that they are taken into account when generating the reconstruction matrix. The analyzing component 328 may also send a control signal to the auxiliary signals generating component 548. For example the analyzing component 328 may control which audio objects/bed channels to include in the auxiliary signals and how they are to be included. In particular, the analyzing component 328 may control the choice of the Q-matrix. The control may for example be based on the MMSE approach described above such that the auxiliary signals are selected such that the reconstructed audio objects/bed channels are as close as possible to the audio objects/bed channels 106*a-b*.

The operation of the decoder side of the audio encoding/decoding system 100 will now be described in more detail with reference to FIG. 6 and the flowchart of FIG. 7.

Figure 6:
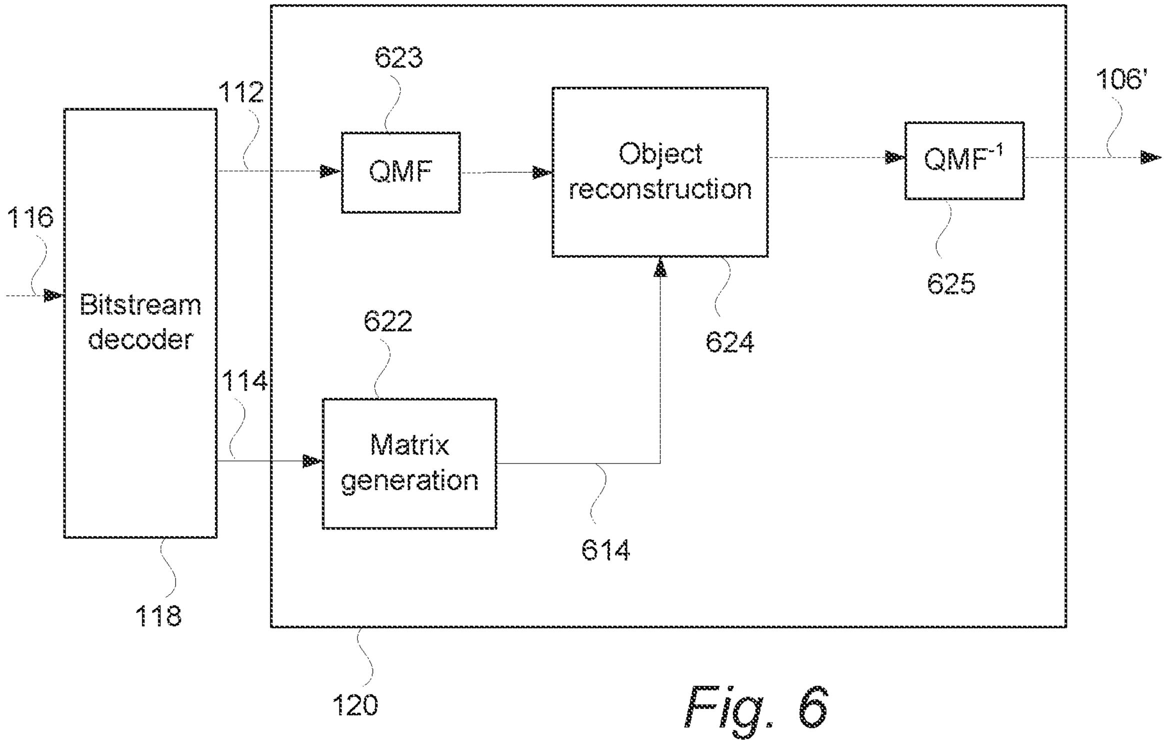
FIG. 6 is a schematic drawing of a decoder side of an audio encoding/decoding system according to example embodiments.
Figure 7:
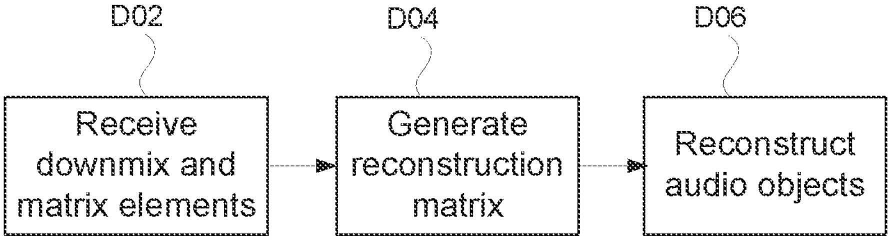
FIG. 7 is a flow chart of a decoding method according to example embodiments.

FIG. 6 illustrates the bit stream decoding component 118 and the decoder 120 of FIG. 1 in more detail. The decoder

120 comprises a reconstruction matrix generating component 622 and a reconstructing component 624.

In step D02 the bit stream decoding component 118 receives the bit stream 116. The bit stream decoding component 118 decodes and dequantizes the information in the bit stream 116 in order to extract the M downmix signals 112 and at least some of the matrix elements 114 of the reconstruction matrix.

The reconstruction matrix generating component 622 receives the matrix elements 114 and proceeds to generate a reconstruction matrix 614 in step D04. The reconstruction matrix generating component 622 generates the reconstruction matrix 614 by arranging the matrix elements 114 at appropriate positions in the matrix. If not all matrix elements of the reconstruction matrix are received, the reconstruction matrix generating component 622 may for example insert zeros instead of the missing elements.

The reconstruction matrix 614 and the M downmix signals are then input to the reconstructing component 624. The reconstructing component 624 then, in step D06, reconstructs the N audio objects and, if applicable, the bed channels. In other words, the reconstructing component 624 generates an approximation 106' of the N audio objects/bed channels 106*a-b*.

By way of example, the M downmix signals may correspond to a particular loudspeaker configuration, such as the configuration of the loudspeakers [Lf Rf Cf Ls Rs LFE] in a 5.1 loudspeaker configuration. If so, the reconstructing component 624 may base the reconstruction of the objects 106' only on the downmix signals corresponding to the full-band channels of the loudspeaker configuration. As explained above, the band-limited signal (the low-frequency LFE signal) may be sent basically unmodified to the renderer.

The reconstructing component 624 typically operates in a frequency domain. More precisely, the reconstructing component 624 operates on individual time/frequency tiles of the input signals. Therefore the M downmix signals 112 are typically subject to a time to frequency transform 623 before being input to the reconstructing component 624. The time to frequency transform 623 is typically the same or similar to the transform 338 applied on the encoder side. For example, the time to frequency transform 623 may be a QMF transform.

In order to reconstruct the audio objects/bed channels 106', the reconstructing component 624 applies a matrixing operation. More specifically, using the previously introduced notation, the reconstructing component 624 may generate an approximation A' of the audio object/bed channels as A'=R1*D. The reconstruction matrix R1 may vary as a function of time and frequency. Thus, the reconstruction matrix may vary between different time/frequency tiles processed by the reconstructing component 624.

The reconstructed audio objects/bed channels 106' are typically transformed back to the time domain 625 prior to being output from the decoder 120.

Figure 8:
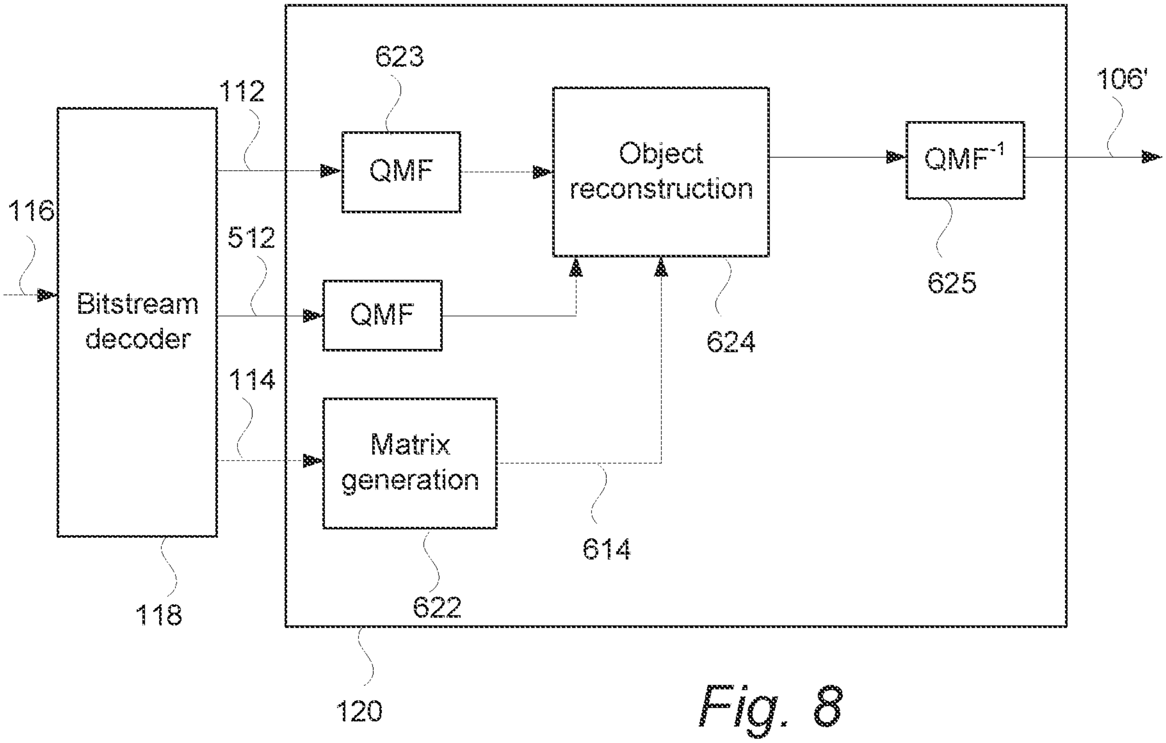
FIG. 8 is a schematic drawing of a decoder side of an audio encoding/decoding system according to example embodiments.

FIG. 8 illustrates the situation when the bit stream 116 additionally comprises auxiliary signals. Compared to the embodiment of FIG. 7, the bit stream decoding component 118 now additionally decodes one or more auxiliary signals 512 from the bit stream 116. The auxiliary signals 512 are input to the reconstructing component 624 where they are included in the reconstruction of the audio objects/bed channels. More particularly, the reconstructing component 624 generates the audio objects/bed channels by applying the matrix operation $A'=R1*[D^T\ C^T]^T$.

Figure 9:
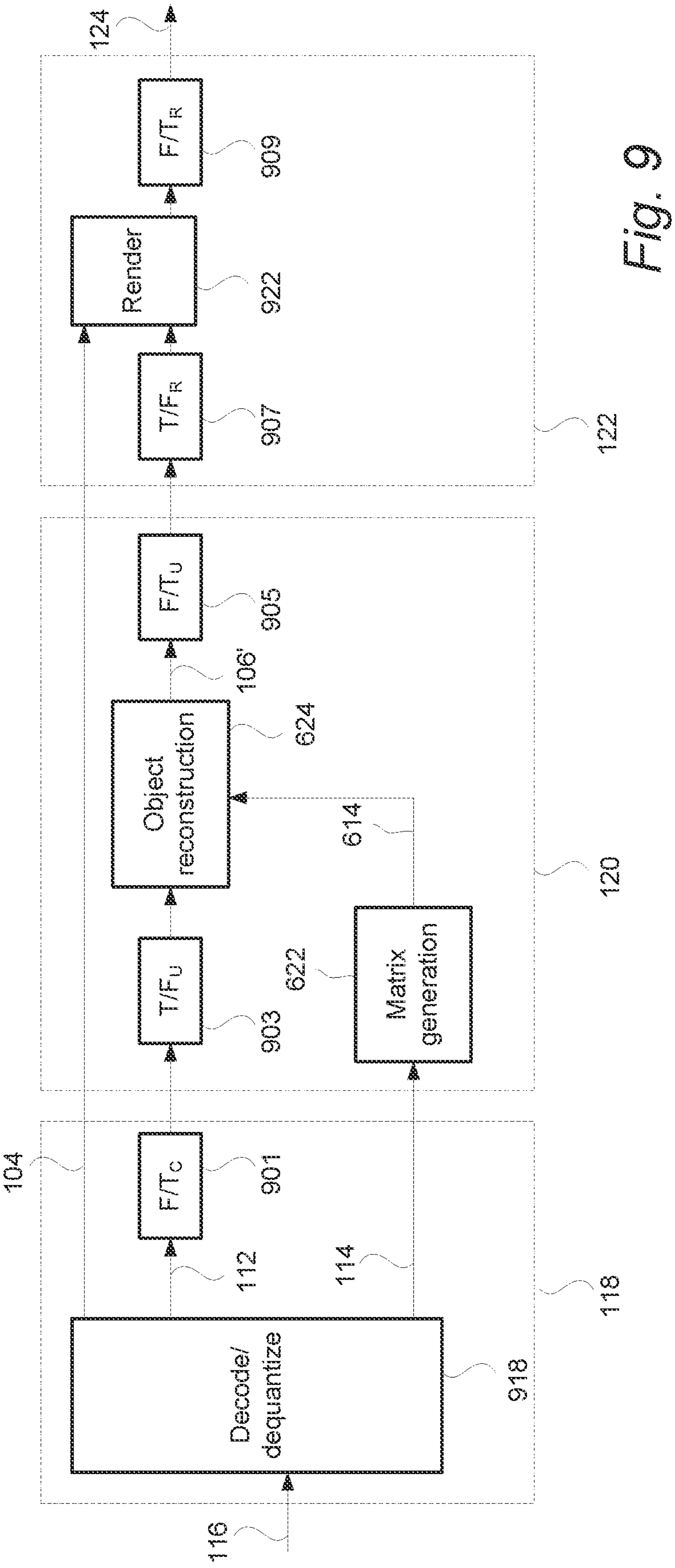
FIG. 9 is a schematic drawing of time/frequency transformations carried out on a decoder side of an audio encoding/decoding system according to example embodiments.

FIG. 9 illustrates the different time/frequency transforms used on the decoder side in the audio encoding/decoding system 100 of FIG. 1. The bit stream decoding component 118 receives the bit stream 116. A decoding and dequantizing component 918 decodes and dequantizes the bit stream 116 in order to extract positional information 104, the M downmix signals 112, and matrix elements 114 of a reconstruction matrix.

At this stage, the M downmix signals 112 are typically represented in a first frequency domain, corresponding to a first set of time/frequency filter banks here denoted by $T/F_C$ and $F/T_C$ for transformation from the time domain to the first frequency domain and from the first frequency domain to the time domain, respectively. Typically, the filter banks corresponding to the first frequency domain may implement an overlapping window transform, such as an MDCT and an inverse MDCT. The bit stream decoding component 118 may comprise a transforming component 901 which transforms the M downmix signals 112 to the time domain by using the filter bank $F/T_C$.

The decoder 120, and in particular the reconstructing component 624, typically processes signals with respect to a second frequency domain. The second frequency domain corresponds to a second set of time/frequency filter banks here denoted by $T/F_U$ and $F/T_U$ for transformation from the time domain to the second frequency domain and from the second frequency domain to the time domain, respectively. The decoder 120 may therefore comprise a transforming component 903 which transforms the M downmix signals 112, which are represented in the time domain, to the second frequency domain by using the filter bank $T/F_U$. When the reconstructing component 624 has reconstructed the objects 106' based on the M downmix signals by performing processing in the second frequency domain, a transforming component 905 may transform the reconstructed objects 106' back to the time domain by using the filter bank $F/T_U$.

The renderer 122 typically processes signals with respect to a third frequency domain. The third frequency domain corresponds to a third set of time/frequency filter banks here denoted by $T/F_R$ and $F/T_R$ for transformation from the time domain to the third frequency domain and from the third frequency domain to the time domain, respectively. The renderer 122 may therefore comprise a transform component 907 which transforms the reconstructed audio objects 106' from the time domain to the third frequency domain by using the filter bank $T/F_R$. Once the renderer 122, by means of a rendering component 922, has rendered the output channels 124, the output channels may be transformed to the time domain by a transforming component 909 by using the filter bank $F/T_R$.

As is evident from the above description, the decoder side of the audio encoding/decoding system includes a number of time/frequency transformation steps. However, if the first, the second, and the third frequency domains are selected in certain ways, some of the time/frequency transformation steps become redundant.

For example, some of the first, the second, and the third frequency domains could be chosen to be the same or could be implemented jointly to go directly from one frequency domain to the other without going all the way to the time-domain in between. An example of the latter is the case where the only difference between the second and the third frequency domain is that the transform component 907 in the renderer 122 uses a Nyquist filter bank for increased frequency resolution at low frequencies in addition to a QMF filter bank that is common to both transformation components 905 and 907. In such case, the transform components 905 and 907 can be implemented jointly in the form of a Nyquist filter bank, thus saving computational complexity.

In another example, the second and the third frequency domain are the same. For example, the second and the third frequency domain may both be a QMF frequency domain. In such case, the transform components 905 and 907 are redundant and may be removed, thus saving computational complexity.

According to another example, the first and the second frequency domains may be the same. For example the first and the second frequency domains may both be a MDCT domain. In such case, the first and the second transform components 901 and 903 may be removed, thus saving computational complexity.

EQUIVALENTS, EXTENSIONS, ALTERNATIVES AND MISCELLANEOUS

Further embodiments of the present disclosure will become apparent to a person skilled in the art after studying the description above. Even though the present description and drawings disclose embodiments and examples, the disclosure is not restricted to these specific examples. Numerous modifications and variations can be made without departing from the scope of the present disclosure, which is defined by the accompanying claims. Any reference signs appearing in the claims are not to be understood as limiting their scope.

Additionally, variations to the disclosed embodiments can be understood and effected by the skilled person in practicing the disclosure, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The systems and methods disclosed hereinabove may be implemented as software, firmware, hardware or a combination thereof. In a hardware implementation, the division of tasks between functional units referred to in the above description does not necessarily correspond to the division into physical units; to the contrary, one physical component may have multiple functionalities, and one task may be carried out by several physical components in cooperation. Certain components or all components may be implemented as software executed by a digital signal processor or microprocessor, or be implemented as hardware or as an application-specific integrated circuit. Such software may be distributed on computer readable media, which may comprise computer storage media (or non-transitory media) and communication media (or transitory media). As is well known to a person skilled in the art, the term computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Further, it is well known to the skilled person that communication media typically embodies computer readable instructions, data structures, program modules or other data in a modulated data signal such as a carrier wave or other transport mechanism and includes any information delivery media.

The invention claimed is:

1. A method for decoding an audio scene represented by N audio signals, the method comprising:

receiving a bit stream comprising L auxiliary signals, M downmix signals and matrix elements of a reconstruction matrix, wherein the matrix elements are transmitted as side information in the bit stream;

generating the reconstruction matrix using the matrix elements; and reconstructing the N audio signals from the M downmix signals and the L auxiliary signals using the reconstruction matrix, wherein approximations of the N audio signals are obtained as linear combinations of the M downmix signals with the matrix elements of the reconstruction matrix as coefficients in the linear combinations, wherein M is less than N, and M is equal or greater than one, and wherein the linear combinations are formed by multiplying a vector comprising the M downmix signals with the reconstruction matrix.

2. The method of claim 1, wherein at least some of the N audio signals are rendered to generate a three-dimensional audio environment.

3. The method of claim 1, wherein the audio scene comprises a three-dimensional audio environment which includes audio elements being associated with positions in a three-dimensional space that can be rendered for playback on an audio system.

4. The method of claim 1, wherein the M downmix signals are decoded before the reconstructing.

5. The method of claim 1, further comprising receiving one or more bed channels and reconstructing the N audio signals from the M downmix signals and the bed channels using the reconstruction matrix.

6. A non-transitory computer-readable medium including instructions, which when executed by a processor of an information processing system, cause the information processing system to perform the method of claim 1.

7. An apparatus for decoding an audio scene represented by N audio signals, the apparatus comprising:

a receiver for receiving a bit stream comprising L auxiliary signals, M downmix signals and matrix elements of a reconstruction matrix, wherein the matrix elements are transmitted as side information in the bit stream;

a first processor for generating the reconstruction matrix using the matrix elements; and a second processor for reconstructing the N audio signals from the M downmix signals and the L auxiliary signals using the reconstruction matrix, wherein approximations of the N audio signals are obtained as linear combinations of the M downmix signals with the matrix elements of the reconstruction matrix as coefficients in the linear combinations, wherein M is less than N, and M is equal or greater than one, and wherein the linear combinations are formed by multiplying a vector comprising the M downmix signals with the reconstruction matrix.

* * * * *